May 9, 1967 H. J. THOMPSON 3,319,163
SPHERICITY MEASURING APPARATUS HAVING A CAPACITOR
PROBE AND A STABLE ROTATING MEANS
Filed July 9, 1963 3 Sheets-Sheet 2
FIG. 2
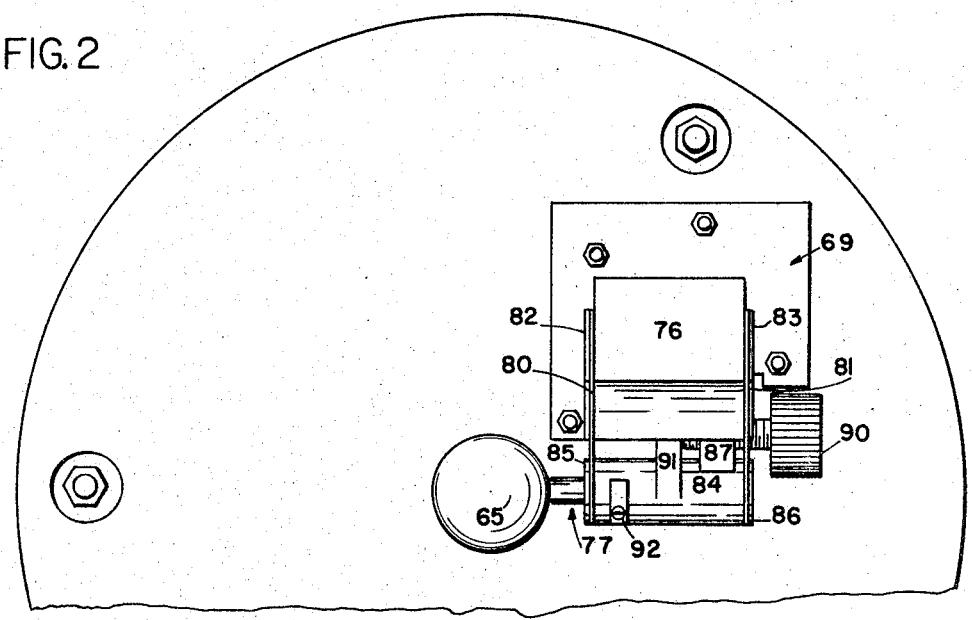
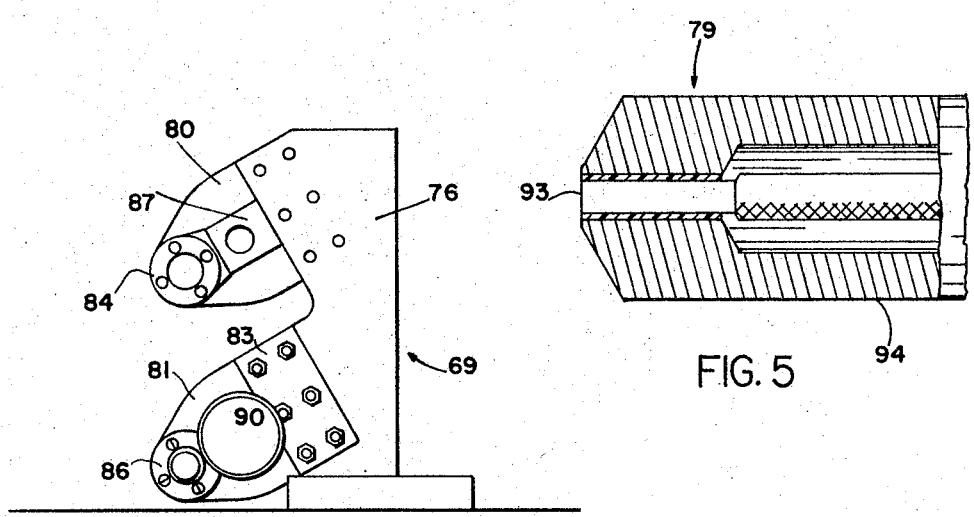
FIG. 4
FIG. 5
INVENTOR.
HOWARD J. THOMPSON
BY
ATTORNEY

United States Patent Office 3,319,163
Patented May 9, 1967

3,319,163
SPHERICITY MEASURING APPARATUS HAVING A CAPACITOR PROBE AND A STABLE ROTATING MEANS
Howard J. Thompson, Stillwater, Minn., assignor to Honeywell Inc., a corporation of Delaware
Filed July 9, 1963, Ser. No. 293,819
6 Claims. (Cl. 324—61)

This invention relates to the field of control apparatus and more particularly to apparatus for measuring the sphericity of spherical rotors and rotor casings for electrically suspended glyroscopes. Successful operation of these devices depends on accuracy of construction, in production quantities, beyond anything heretofore dreamed of even in experimental design. Not only must the manufacturing procedures be highly refined, but measuring instruments must be of at least one order of magnitude greater in refinement.

The present invention has for its specific object to provide means for checking the sphericity of spherical surfaces with accuracy of fractional microinches, where the spherical radius is in the range of a few inches. To accomplish this it is necessary to achieve two subordinate objects. The first is causing relative movement between the surface to be measured and the measuring element, which preferably partakes only of rotation, and which at a minimum is repeatable, from rotation to rotation of the body, within the limits of measuring accuracy desired. The second subordinate object is to provide means responsive to changes in the distance being measured also within the desired limits of accuracy.

A more specific object of the invention is therefore to provide highly stable means for causing rotation of a body having a spherical surface whose sphericity is to be checked, in which the rotation has no components other than rotation which are not repeatable, together with means responsive to the mean displacement of a continuously changing limited area of the spherical surface from a reference point. Still further objects are to provide an accurate body rotator and to provide an improved, noncontacting measuring system for determining spherical radii.

Various other objects, advantages and features of novelty not individually enumerated above which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

Figure 1:
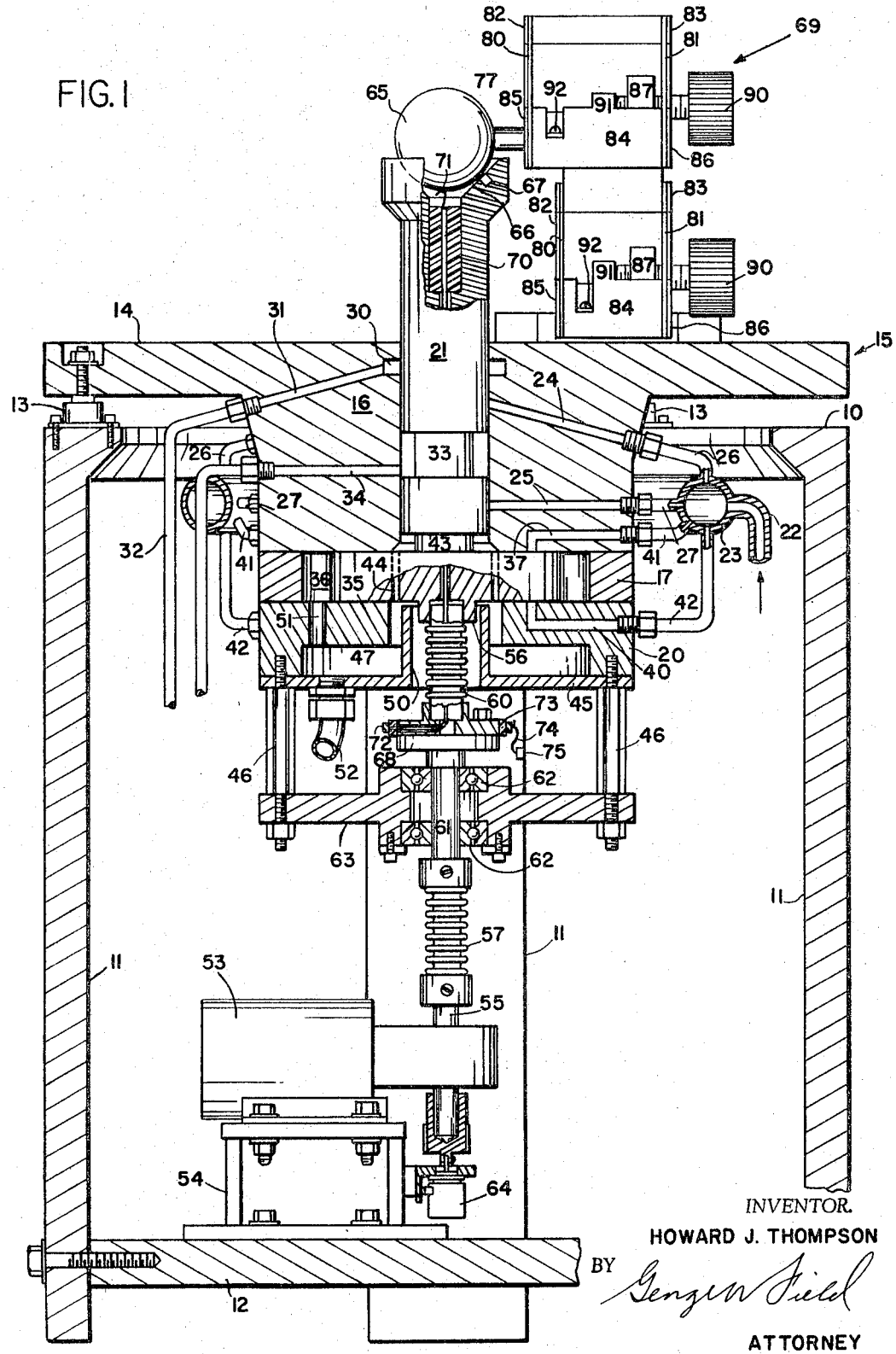
Figure 3:
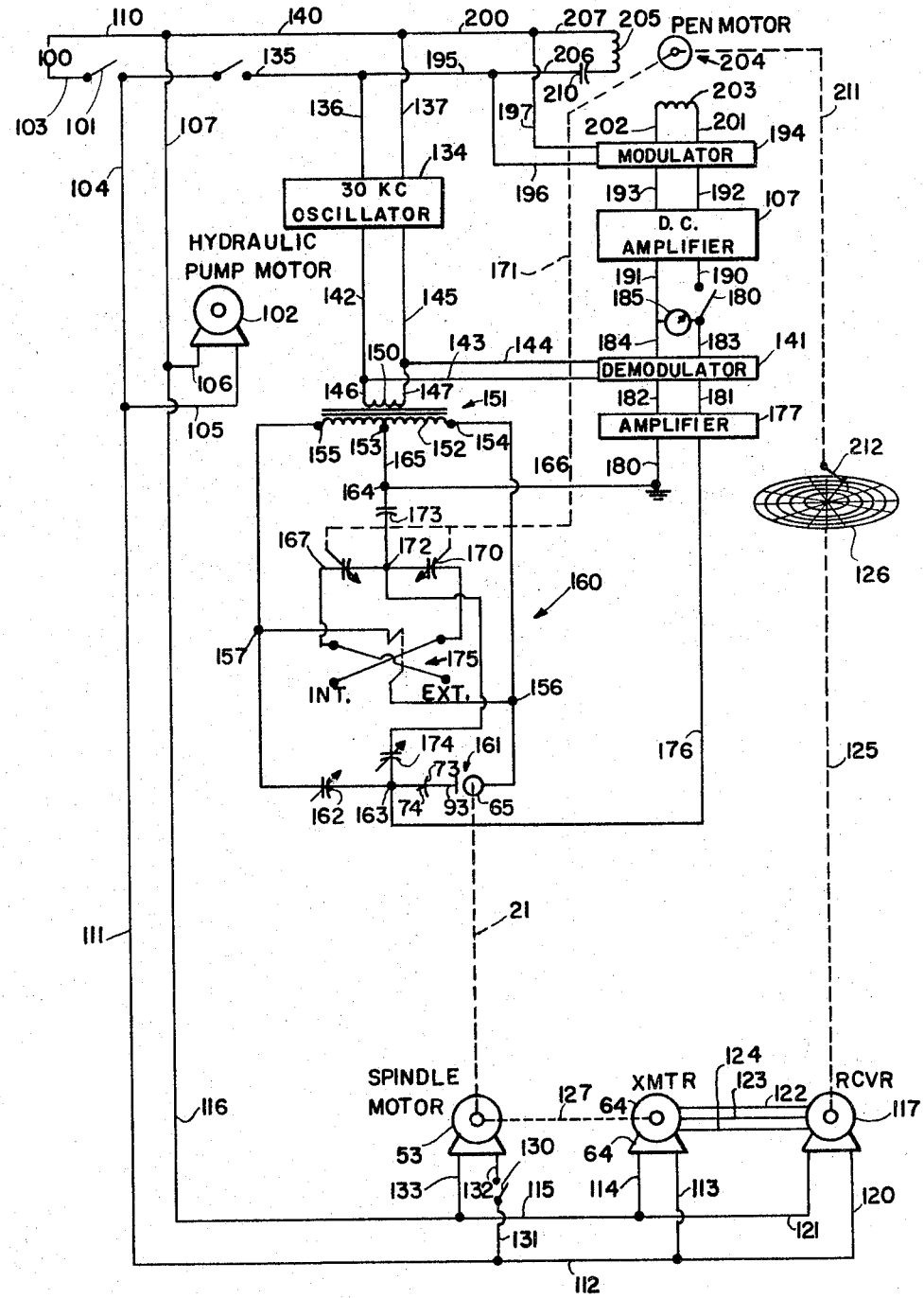

In the drawing, FIGURE 1 is a vertical section of apparatus according to the invention, FIGURE 2 is a partial plan view of the apparatus, FIGURE 3 is a schematic circuit diagram showing the power and electrical measuring equipment, and FIGURES 4, and 5 show details.

In FIGURES 1 and 2 there is shown a support having a circular top 10 and a plurality of legs 11 joined near their lower ends by a shelf 12. An enclosing casing not shown may be provided if desired. Spaced around top 10 are a plurality of vibration damping elements 13 shown conventionally as shock mounts, which support the upper work surface 14 of a housing 15 including an upper portion 16, an intermediate portion 17 and a lower portion 20 suitably assembled in unitary fashion by conventional means not shown. Portion 16 is accurately bored, ground and honed to receive an accurately cylindrical spindle 21 on the upper end of which the body to be checked is mounted. It has been found by experience that no mechanical type of bearing such as ball bearings for example is capable of supporting spindle 21 with the stability and freedom from spurious nonrotary motion which is required in this instrument. Recourse was finally had therefore to a hydrostatic bearing in which the spindle is supported not only radially but also axially by a fluid under pressure. This fluid is supplied through a conduit 22 to a header 23 which surrounds portion 16. Fluid is supplied to support the spindle radially through conduits bored radially in portion 16 at a number of points around the spindle. One pair of such conduits are shown at 24 and 25, and are connected to header 23 at 26 and 27. An annular groove 30 is machined into the portion 16 near its working surface for permitting spent fluid from conduits 24 to drain after use and it is connected by a conduit 31 and a drain conductor 32 to the sump of a hydraulic system. Of course the bore of portion 16 is larger above void 30 than below it, to prevent unlubricated contact between the spindle and portion 16. The spindle is grooved at 33 between bores 24 and 25 to communicate with a further drain bore 34 conducting away spent fluid supplied through bores 24 and 25.

Spindle 21 is enlarged at 35 to provide a pair of surfaces accurately normal to the spindle axis. Portion 17 is slightly thicker than the enlarged portion 35 of spindle 21, and is bored at 36 to a considerably larger diameter. A plurality of bores 37 and 40 in portions 16 and 20 respectively are provided at various positions around the spindle axis, and are connected to header 23 at 41 and 42, respectively to supply fluid for supporting spindle 21 axially. A further groove 43 is provided in spindle 21 to collect fluid draining inwardly from bores 37 and downwardly from bores 25, and the spindle enlargement is bored at 44 parallel to its axis to drain fluid out of the space so formed. A further member 45 is supported below portion 20 by suitable spacing studs 46, and cooperates with portion 20 to comprise a drain chamber 47 having a central circular wall 50. Member 20 is centrally bored axially to permit fluid draining through bores 44 to pass into chamber 47, and a plurality of further bores 51 conduct into chamber 47 the fluid draining outwardly into bore 36 from bores 37 and 40. The outlet for chamber 47 is shown at 52.

Rotation of spindle 51 is brought about by a reversible, variable speed motor 53 carried on a bracket 54 on shelf 12. Just as work surface 14 is vibrationally isolated from motor 53 by members 13, so spindle 21 must be isolated from motor 53, and this is accomplished by coupling the output shaft 55 of motor 53 to a downwardly extending shoulder 56 on spindle 21 through a pair of vibration damping means in the form of bellows 57 and 60 joined by a stud shaft 61 carried in bearings 62 in a plate 63 mounted on studs 46. A downward extension of motor shaft 55 is coupled to a synchro transmitter 64.

The body to be checked is supported on the top of spindle 21 by any suitable means, which may of course be constructed to suit the outline of the particular part being checked. For measuring external curves such as the sphere indicated at 65, the upper end of the spindle may be machined to form a conical cavity 66 with carefully ground diamond sphere supports 67. The spindle is hollow and carries at its upper end an insulating plug 70 from which there projects a flexible contact whisker 71 which electrically engages the sphere. The whisker is continued as a conductor passing down the hollow spindle and inside of bellows 60, to be connected with a slip ring 72 carried on the upper portion of the coupling 68 between bellows 60 and stub shaft 61, and insulated therefrom by a suitable ring 73 of insulating material. A brush 74 engages ring 72 and is insulated from leg 11, which supports it, by a suitable bracket 75.

As shown in FIGURES 1, 2 and 4, an electrode support 69 is suitably secured to surface 14 in such a fashion that the axis of a probe 77 is an extension of a radius of the sphere. Support 69 comprises a stepped block 76 having first and second electrode holding assemblies each comprising a pair of leaf springs 80 and 81 secured to block 76 by clamp plates 82 and 83 and bored to receive an electrode holder 84 which is held by clamp rings 85 and 86. Each step of block 76 includes a projecting stud 87 cross bored and tapped to receive a thumb screw 90: the end of screw 90 engages a rib 91 extending from holder 84 so that slight, substantially linear movement of the electrode may be accomplished by thumb screw operation. The electrode is secured in holder 84 by suitable means 92.

FIGURE 5 shows probe 77 to include a central electrode 93 potted into an outer casing 94 near one end thereof, the end of the combined structure being formed to a plane. The conductor and casing are continued as the conductor and shield of a shielded wire leading from the probe.

Referring now to FIGURE 3 the equipment is there shown as electrically energized from an A.C. power source 100. When a main switch 101 is closed power is transmitted to a hydraulic pump motor 102, for supplying hydraulic fluid to header 23, through conductor 103, switch 101, and conductors 104 and 105, the circuit being completed through conductors 106, 107 and 110. Energy is supplied to synchro transmitter 64 through conductor 103, switch 101, conductors 104, 111, 112 and 113, the circuit being completed through conductors 114, 115, 116, 107 and 110. A synchro receiver 117 has rotor and stator windings, one energized from source 100 through conductor 103, switch 101, and conductors 104, 111, 112 and 120, the circuit being completed through conductors 121, 115, 116, 107 and 110. The other winding of receiver 117 is energized from transmitter 64 through conductors 122, 123 and 124. As a result, receiver 117 acts through a mechanical drive 125 to position a chart 126 rotationally in accordance with the position of an input connection 127 to transmitter 64. Connection 127 is driven by spindle motor 53, which is energized from conductors 111 and 116, when a switch 130 is closed, through conductors 131, switch 130 and conductors 132 and 133. Accordingly when switch 130 is closed, spindle 21 and chart 126 commence to rotate at a desired rate and in a desired direction.

A thirty kilocycle oscillator 134 is energized from source 100 through conductor 103, switch 101, conductor 138, a switch 139, and conductors 135 and 136, the circuit being completed through conductors 137, 140 and 110. Oscillator 134 supplies a reference voltage to a demodulator 141 through conductors 142 and 143 and conductors 144 and 145, and also energizes, through conductors 142 and 146 and conductors 145 and 147, the primary winding 150 of a transformer 151 having a secondary winding 152 with a center tap 153. The two halves of winding 152 are interwound to give maximum coupling, to compensate for any unequal loading in the two halves of the secondary winding, and the terminals 154 and 155 of the winding are connected to the input terminals 156 and 157 of a capacitance bridge 160 of which the variable capacitor 161 comprising electrode 93 and sphere 65 comprises one arm and a second variable capacitor 162 comprises a second arm. The common point 163 between these two capacitors is one output terminal of the bridge, and the second output terminal 164 is connected to center tap 153 by conductor 165 and is grounded at 166. It is understood that the outer shield of probe 77 is also grounded, to minimize electrical noise pickup.

The third and fourth arms of bridge 160 comprise a pair of variable capacitors 167 and 170 which are simultaneously operable, in opposite directions from a condition of equal capacitance, by a mechanical connection 171. The common point 172 between capacitors 167 and 170 is connected to terminal 164 through a fixed capacitor 173, and to terminal 163 by a variable capacitor 174. The terminals of capacitors 167 and 170 not connected to point 172 are connected to the fixed contacts of a conventional reversing switch 175, of which the movable contacts are connected to input terminals 156 and 157. Now adjustment of mechanical connection 171 in a first sense changes the bridge output signal in one sense if switch 175 is thrown to the left, and in the opposite sense if switch 175 is thrown to the right, thus allowing the bridge output of a specific sense to stand for increase in diameter of the body being checked regardless of whether the curve is concave or convex.

Output terminal 163 is connected to supply an input through conductor 176 to an amplifier 177 having a second input terminal grounded at 180: the amplifier output is supplied on conductors 181 and 182 to demodulator 141. The output is of the oscillator frequency: it is of one phase or other depending on the sense of the unbalance of the bridge, and is dependent in amplitude on the extent of bridge unbalance. The demodulator output is supplied by conductors 183 and 184 to a center zero indicator 185, so that the polarity and size of the indication is a measure of the sense and magnitude of bridge unbalance.

When it is desired to record the bridge signal, a switch 186 is closed, and the output of demodulator 141 is supplide to a D.C. amplifier 187 through conductors 190 and 191 and thence through conductors 192 and 193 to a modulator 194 which receives a reference signal from source 100 through conductor 103, switch 101, conductor 138, a switch 139, and conductors 135, 195 and 196, the circuit being completed through conductors 197, 200, 140 and 110. The output of modulator 194 is an alternating voltage of the frequency of source 100, which reverses in phase and varies in amplitude with reversal of the sense and variation in the extent of bridge unbalance. This output is supplied through conductors 210 and 202 to the amplifier phase winding 203 of a split phase A.C. motor 204 having a line phase winding 205 energized from conductors 195 and 200 through conductors 206 and 207 and a phasing capacitor 210. The shaft of motor 204 is connected to operate variable capacitors 167 and 170 through connection 171, and also acts through connection 211 to move a pen 212 radially with respect to chart 126 from a position midway on the chart. Motor operation continues until bridge 160 is balanced by adjustment of capacitors 167 and 170, whereupon the position of pen 212 on chart 126 is representative of the instantaneous radius of the spherical surface.

Capacitor 174 in bridge 160 is a vernier adjustment on scale factor and capictor 162 is a vernier adjustment on scale zero. In use the positioning of probe 77 in holder 76 is made using a gauge, and the actual scale factor in microinches is determined by calibration using an interferometer, since no other method is sufficiently accurate. The method of calibration forms no part of the present invention, but is merely mentioned to point out what the inventor has accomplished: with a circular chart of 12 inches diameter, the actual chart width is somewhat more than 4 inches so that reading to 1% of the scale is possible, and with the instrument properly adjusted a repeatable resolution in the range of .03 to .5 microinch has been demonstrated.

The hydrostatic bearing for the instrument has resulted in charts free from the continual and nonrepeatable "noise" due to bearing balls or rollers, and the curve on the chart for a single sphere allowed to rotate through a plurality of revolutions repeats itself almost identically even at the highest accuracy setting of the instrument.

The probe in FIGURE 5 is adapted for use with convex surfaces and is satisfactory for spheres or cylinders with radii from infinity to about one inch. The diameter of the central electrode is .06 inch, its spacing from the outer shield is .010 inch, and its spacing from a sphere being measured varies from .002 inch to .015 inch depending on the scale factor desired. Note that these quantities are all of the same general order of magnitude, although the last is always a minor fraction of the first. On the other hand, for a sphere of one and one-half inches diameter the area of the probe is less than $\frac{1}{10000}$ of the area of the spherical surface. The ratio here must be large if the apparatus is to detect asphericity of slight area and distance.

For checking concave surfaces, it may be desirable to modify the configuration of the body holder on top of the spindle and to change the shape of the probe to give minimum interference with the body being rotated: such changes will be obvious to those skilled in the art, and are believed to come within the scope of the inventive concept here.

Numerous objects and advantages of this invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principles of the invention, to the full extent indicated by the broad general meaning of the terms in which the appended claims are expressed.

What is claimed is:

1. In combination: a spindle; hydrostatic means supporting said spindle axially and radially for substantially frictionless rotation about a vertical axis; means for supporting an electrically conductive body, having a spherical surface of known nominal radius, on the top end of said spindle with the center of the spherical surface lying at a predetermined point on said vertical axis, including contact means for making electrical connection to the body; drive means for causing said rotation of said spindle; vibration damping means connecting said spindle in driven relation to said drive means; a capacitive probe including an electrically insulated plane electrode; vibration damping means mounting said electrode close to said spindle for adjustment along an axis, substantially perpendicular to the plane of said electrode at the center thereof, which intersects said vertical axis at said predetermined point; and means connected to said contact means and said electrode for giving a signal determined by the instantaneous distance between the surface and said electrode.

2. In combination: a spindle; hydrostatic means supporting said spindle axially and radially for substantially frictionless rotation about a vertical axis; means for supporting a sphere of known nominal radius on the top end of said spindle with the center of the sphere lying at a predetermined point on said vertical axis, including contact means for making electrical connection to the sphere; drive means for causing said rotation of said spindle; vibration damping means connecting said spindle in driven relation to said drive means; a capacitive probe including an electrically insulated plane electrode; vibration damping means mounting said electrode close to said spindle for adjustment along an axis, substantially perpendicular to the plane of said electrode at the center thereof, which intersects said vertical axis at said predetermined point; and means connected to said contact means and said electrode for giving a signal determined by the instantaneous distance between the sphere and said electrode.

3. In combination: a spindle; hydrostatic means supporting said spindle axially and radially for substantially frictionless rotation about a vertical axis; means for supporting an electrically conductive body, having a spherical surface of known nominal radius, on the top end of said spindle with the center of the spherical surface lying at a predetermined point on said vertical axis, including contact means for making electrical connection to the body; drive means for causing said rotation of said spindle; vibration damping means connecting said spindle in driven relation to said drive means; a capacitive probe including an electrically insulated plane electrode; vibration damping means mounting said electrode close to said spindle for adjustment along an axis, substantially perpendicular to the plane of said electrode at the center thereof, which intersects said vertical axis at said predetermined point; and means including a capacitance bridge connected to said contact means and said electrode for giving an electrical signal determined by the instantaneous distance between the surface and said electrode.

4. In combination: a spindle; hydrostatic means supporting said spindle axially and radially for substantially frictionless rotation about a vertical axis; means for supporting an electrically conductive body, having a spherical surface of known nominal radius, on the top end of said spindle with the center of the spherical surface lying at a predetermined point on said vertical axis, including contact means for making electrical connection to the body; drive means for causing said rotation of said spindle; vibration damping means connecting said spindle in driven relation to said drive means; a capacitive probe including an electrically insulated central plane electrode and a shield ring coplanar therewith and spaced therefrom; vibration damping means mounting said electrode close to said spindle for adjustment along an axis, substantially perpendicular to the plane of said electrode at the center thereof, which intersects said vertical axis at said predetermined point; and means connected to said contact means and said electrode for giving a signal determined by the instantaneous distance between the surface and said electrode.

5. In combination: a spindle; hydrostatic means supporting said spindle axially and radially for substantially frictionless rotation about a vertical axis; means for supporting a body, having a spherical surface of known nominal radius, on the top end of said spindle with the center of the spherical surface lying at a predetermined point on said vertical axis, including contact means for making electrical connection to the body; drive means for causing said rotation of said spindle; vibration damping means connecting said spindle in driven relation to said drive means; a capacitive probe including an electrically insulated plane electrode; vibration damping means mounting said electrode close to said spindle for adjustment along an axis, substantially perpendicular to the plane of said electrode at the center thereof, which intersects said vertical axis at said predetermined point; and means connected to said contact means and said electrode for giving a signal determined by the instantaneous distance between the surface and said electrode.

6. In combination: a spindle; hydrostatic means supporting said spindle axially and radially for substantially frictionless rotation about a vertical axis; means for supporting an electrically conductive body, having a spherical surface of known nominal radius, on the top end of said spindle with the center of the spherical surface lying at a predetermined point on said vertical axis, including contact means for making electrical connection to the body; drive means for causing said rotation of said spindle; vibration damping means connecting said spindle in driven relation to said drive means; a capacitive probe including an electrically insulated central plane electrode and a shield ring coplanar therewith and spaced therefrom; vibration damping means mounting said electrode close to said spindle for adjustment along an axis, substantially perpendicular to the plane of said electrode at the center thereof, which intersects said vertical axis at said predetermined point; and means connected to said contact means and said electrode for giving a signal determined by the instantaneous distance between the surface and said electrode, the spacing between said electrode and said shield ring being generally of the same order of magnitude as the distance between said electrode and the surface.

References Cited by the Examiner
UNITED STATES PATENTS

| | | | |
|---|---|---|---|
| 2,785,474 | 3/1957 | Mages et al. | 33—178 |
| 2,880,390 | 3/1959 | Calvert | 324—61 |
| 3,182,255 | 5/1965 | Hopkins et al. | 324—61 |
| 3,207,979 | 9/1965 | Perkins | 324—61 |

WALTER L. CARLSON, *Primary Examiner.*

W. H. BUCKLER, E. E. KUBASIEWICZ,
*Assistant Examiners.*